US011985545B2

(12) United States Patent
Diaz Sendra (10) Patent No.: US 11,985,545 B2
(45) Date of Patent: May 14, 2024

(54) CELLULAR TELECOMMUNICATIONS NETWORK

(71) Applicant: British Telecommunications Public Limited Company, London (GB)

(72) Inventor: Salvador Diaz Sendra, London (GB)

(73) Assignee: British Telecommunications Public Limited Company (GB)

( * ) Notice: Subject to any disclaimer, the term of this patent is extended or adjusted under 35 U.S.C. 154(b) by 0 days.

(21) Appl. No.: 17/754,168

(22) PCT Filed: Aug. 13, 2020

(86) PCT No.: PCT/EP2020/072703
§ 371 (c)(1),
(2) Date: Mar. 25, 2022

(87) PCT Pub. No.: WO2021/063578
PCT Pub. Date: Apr. 8, 2021

(65) Prior Publication Data
US 2022/0295348 A1 Sep. 15, 2022

(30) Foreign Application Priority Data

Sep. 30, 2019 (EP) ..................................... 19200378
Sep. 30, 2019 (GB) ..................................... 1914031

(51) Int. Cl.
*H04W 28/088* (2023.01)
(52) U.S. Cl.
CPC ................................. *H04W 28/088* (2023.05)
(58) Field of Classification Search
CPC ............. H04W 28/0842; H04W 16/08; H04W 28/0242; H04W 28/0247; H04W 28/0284;
(Continued)

(56) References Cited

U.S. PATENT DOCUMENTS 11,399,318 B2 * 7/2022 Park ...................... H04W 76/19
11,399,407 B2 * 7/2022 Lee ........................ H04W 76/27
(Continued)

FOREIGN PATENT DOCUMENTS

CN 101557609 A 10/2009
CN 108029037 A 5/2018
(Continued)

OTHER PUBLICATIONS

3GPP TR 38.801 V14.0.0 "3rd Generation Partnership Project; Technical Specification Group Radio Access Network; Study on New Radio Access Technology: Radio Access Architecture and Interfaces (Release 14)," Mobile Competence Centre, 2017, pp. 1-91.

(Continued)

*Primary Examiner* — Mehmood B. Khan
(74) *Attorney, Agent, or Firm* — Pranger Law PC (57) ABSTRACT

This disclosure provides a method of balancing load in a cellular telecommunications network, the cellular telecommunications network having a first transceiver, a second transceiver, a first core network and a plurality of User Equipment (UE) the method including connecting a UE of the plurality of UEs to the first transceiver and second transceiver in a first non-standalone deployment mode in which the UE communicates control plane traffic and user plane traffic with the first transceiver and communicates user plane traffic only with the second transceiver; monitoring a load of one of more of the first transceiver, second transceiver and the first core network; determining whether the load satisfies a trigger threshold; and, if it does, responding by, connecting the UE to the first transceiver and second transceiver in a second non-standalone deployment mode in which the UE communicates control plane traffic and user (Continued)

plane traffic with the second transceiver and communicates user plane traffic only with the first transceiver.

11 Claims, 5 Drawing Sheets

(58) Field of Classification Search
CPC ............. H04W 28/08; H04W 28/0933; H04W 28/0942; H04W 52/343; H04W 72/52
See application file for complete search history.

(56) References Cited

U.S. PATENT DOCUMENTS

| | | | |
|---|---|---|---|
| 2019/0053115 A1 | 2/2019 | Ngai et al. | |
| 2019/0053319 A1 | 2/2019 | Jeon et al. | |
| 2019/0223091 A1 | 7/2019 | Huang-Fu et al. | |
| 2020/0021487 A1* | 1/2020 | Yao | H04L 41/40 |
| 2020/0045583 A1* | 2/2020 | Kim | H04W 76/15 |
| 2020/0351643 A1* | 11/2020 | Dhanapal | H04B 7/0413 |
| 2020/0351726 A1* | 11/2020 | Chauhan | H04W 36/0069 |
| 2021/0014713 A1* | 1/2021 | Xu | H04W 24/10 |
| 2021/0051104 A1* | 2/2021 | He | G06N 20/00 |
| 2021/0084576 A1* | 3/2021 | Zhu | H04W 48/16 |
| 2021/0127351 A1* | 4/2021 | Stojanovski | H04W 76/27 |
| 2022/0159768 A1* | 5/2022 | Zhu | H04L 1/1642 |

FOREIGN PATENT DOCUMENTS

| | | | |
|---|---|---|---|
| CN | 108617020 A | 10/2018 | |
| CN | 110036683 A | 7/2019 | |
| EP | 2982214 A1 | 2/2016 | |
| EP | 2982214 B1 * | 8/2018 | ........ H04W 36/0027 |
| EP | 3547793 A1 | 10/2019 | |
| EP | 3599787 A1 * | 1/2020 | ........... H04B 1/7083 |
| EP | 3606282 A1 | 2/2020 | |
| WO | WO-2017126945 A1 | 7/2017 | |
| WO | WO-2017198898 A1 | 11/2017 | |
| WO | WO-2018195943 A1 | 11/2018 | |

OTHER PUBLICATIONS

CATT: "Considerations on inter-RAT mobility between NR and LTE," 3GPP Draft; R3-161154, 3rd Generation Partnership Project (3GPP), Mobile Competence Centre ; 650, Route Des Lucioles ; F-06921 Sophia-Antipolis Cedex, France, May 22, 2016, vol. RAN WG3. No., Nanjing, P.R. China; XP051105958, Retrieved from the Internet: URL:http://www.3gpp.org/ftp/Meetings_3GPP_SYNC/RAN3/Docs/ [retrieved on May 22, 2016], 5 pages.
Extended European Search Report for Application No. 19200378.8, dated Feb. 18, 2020, 9 pages.
International Search Report and Written Opinion for Application No. PCT/EP2020/072703, dated Oct. 26, 2020, 13 pages.
Kibria M.G., et al., "Next Generation New Radio Small Cell Enhancement: Architectural Options, Functionality and Performance Aspects," Feb. 28, 2018, IEEE, vol. 25, No. 4, pp. 1-9.
Search Report for Great Britain Application No. 1914031.8, dated Feb. 17, 2020, 4 pages.
First Notification of Office Action and Search Report for Chinese Application No. 202080064186.0, dated Jun. 17, 2022, 6 pages.
International Preliminary Report on Patentability and Written Opinion for Application No. PCT/EP2020/072703, dated Apr. 14, 2022, 9 pages.

* cited by examiner

CELLULAR TELECOMMUNICATIONS NETWORK

PRIORITY CLAIM

The present application is a National Phase entry of PCT Application No. PCT/EP2020/072703, filed Aug. 13, 2020, which claims priority from EP Patent Application No. 19200378.8, filed Sep. 30, 2019 and GB Patent Application No. 1914031.8, filed Sep. 30, 2019, each of which is hereby fully incorporated herein by reference.

TECHNICAL FIELD

The present disclosure relates to a cellular telecommunications network.

BACKGROUND

The $5^{th}$ Generation cellular telecommunications protocol ("5G") includes a new 5G Core network ("5GC") and a new radio access protocol ("New Radio"). The new and upgraded hardware required to implement these technologies requires great capital investment. Accordingly, the $3^{rd}$ Generation Partnership Project (3GPP), the standards body responsible for defining these protocols, defined both standalone and non-standalone deployments of 5G. Standalone deployment requires both the 5G core network and New Radio hardware to be implemented, and both user plane and control plane traffic to be based solely on the 5G protocols. This deployment (known as "Option 2") allows users to enjoy the full benefits of the 5G network. However, as it requires great up-front capital expenditure from Mobile Network Operators (MNOs), it is more likely that MNOs will use one or more of the non-standalone deployments to offer users dual-connectivity to both their existing cellular network and a partially implemented 5G network, with the ultimate goal of upgrading/replacing all of their existing cellular network to 5G.

The most common form of non-standalone deployment, known as "Option 3", utilizes an Evolved Packet Core (EPC) network of the $4^{th}$ Generation ("4G") cellular network, which is connected to both 5G base stations (often referred to as a "gNode B", for next Generation Node B) and 4G base stations (often referred to as an "eNode B", for Evolved Node B). This allows MNOs to implement 5G New Radio without the expense of implementing the 5GC. This deployment therefore offers dual connectivity to User Equipment (UE) providing simultaneous 4G radio access (e.g. via the Long Term Evolution, "LTE", radio access protocol) and 5G radio access via New Radio, in which the 4G base station is responsible for user plane and control plane traffic and the 5G base station is responsible for user plane traffic only.

Another form of non-standalone deployment, known as "Option 7", utilizes a 5GC which is connected to both 5G base stations and 4G base stations. UEs may, again, enjoy dual connectivity to both the 4G and 5G base stations, and further enjoy the advantages of a 5GC, with the 4G base station responsible for user plane and control plane traffic and the 5G base station responsible for user plane traffic only.

A further form of non-standalone deployment, known as "Option 4", is very similar to Option 7 and includes a 5GC connected to both 5G base stations and 4G base stations, but differs in that the 5G base station is responsible for both user plane and control plane traffic and the 4G base station is responsible for user plane traffic only.

In these non-standalone deployments, the base stations are classified as either a Master Node (MN) or Secondary Node (SN), in which the MN is the base station responsible for both the user plane and control plane (and thus acts as a mobility anchor towards the core network) and the SN provides additional resources for the user plane only. A Master Cell Group (MCG) is also defined as a group of cells associated with the MN, and a Secondary Cell Group (SCG) is defined as a group of cells associated with the SN. The following table summarizes the various protocols used by the core network, MCG and SCG in each non-standalone deployment scenario:

TABLE 1

Protocols used in Non-Standalone Deployments of 5G

| | Core Network | MCG | SCG |
|---|---|---|---|
| Option 3 | EPC | LTE | New Radio |
| Option 4 | 5GC | New Radio | LTE |
| Option 7 | 5GC | LTE | New Radio |

SUMMARY

According to a first aspect of the disclosure, there is provided a method of balancing load in a cellular telecommunications network, the cellular telecommunications network having a first transceiver, a second transceiver, a first core network and a plurality of User Equipment (UE) the method comprising connecting a UE of the plurality of UEs to the first transceiver and second transceiver in a first non-standalone deployment mode in which the UE communicates control plane traffic and user plane traffic with the first transceiver and communicates user plane traffic only with the second transceiver; monitoring a load of one or more of the first transceiver, second transceiver and the first core network; determining whether the load satisfies a trigger threshold; and, if it does, responding by, connecting the UE to the first transceiver and second transceiver in a second non-standalone deployment mode in which the UE communicates control plane traffic and user plane traffic with the second transceiver and communicates user plane traffic only with the first transceiver.

According to a second aspect of the disclosure, there is provided a network node for a cellular telecommunications network, the cellular telecommunications network having a first transceiver, a second transceiver, a first core network and a plurality of User Equipment (UE) wherein a UE of the plurality of UEs is connected to the first transceiver and second transceiver in a first non-standalone deployment mode in which the UE communicates control plane traffic and user plane traffic with the first transceiver and communicates user plane traffic only with the second transceiver, the network node comprising: a processor configured to: monitor a load of one or more of the first transceiver, second transceiver and the first core network; determine whether the load satisfies a trigger threshold; and, if it does, responding by, causing the UE to connect to the first transceiver and second transceiver in a second non-standalone deployment mode in which the UE communicates control plane traffic and user plane traffic with the second transceiver and communicates user plane traffic only with the first transceiver. The network node may be the first or second transceiver or a core networking node.

The cellular telecommunications network may further include a second core network, the first and second transceivers may both include backhaul connections to both the first and second core networks and the step of monitoring the load may be of one or more of the first transceiver, second transceiver, first core network and second core network, wherein, in the first non-standalone deployment mode, the UE may communicate with the first core network via the first and second transceivers, and, in the second non-standalone deployment mode, the UE may communicate with the second core network via the first and second transceivers.

A first communications protocol may be used between the UE and the first transceiver and a second communications protocol may be used between the UE and the second transceiver.

A first communications protocol may be used between the UE and the first core network and a second communications protocol may be used between the UE and the second core network.

According to a third aspect of the disclosure, there is provided a computer program product comprising instructions which, when the program is executed by a computer, cause the computer to carry out the method of the first aspect of the disclosure. A computer program may be stored on a computer-readable data carrier.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
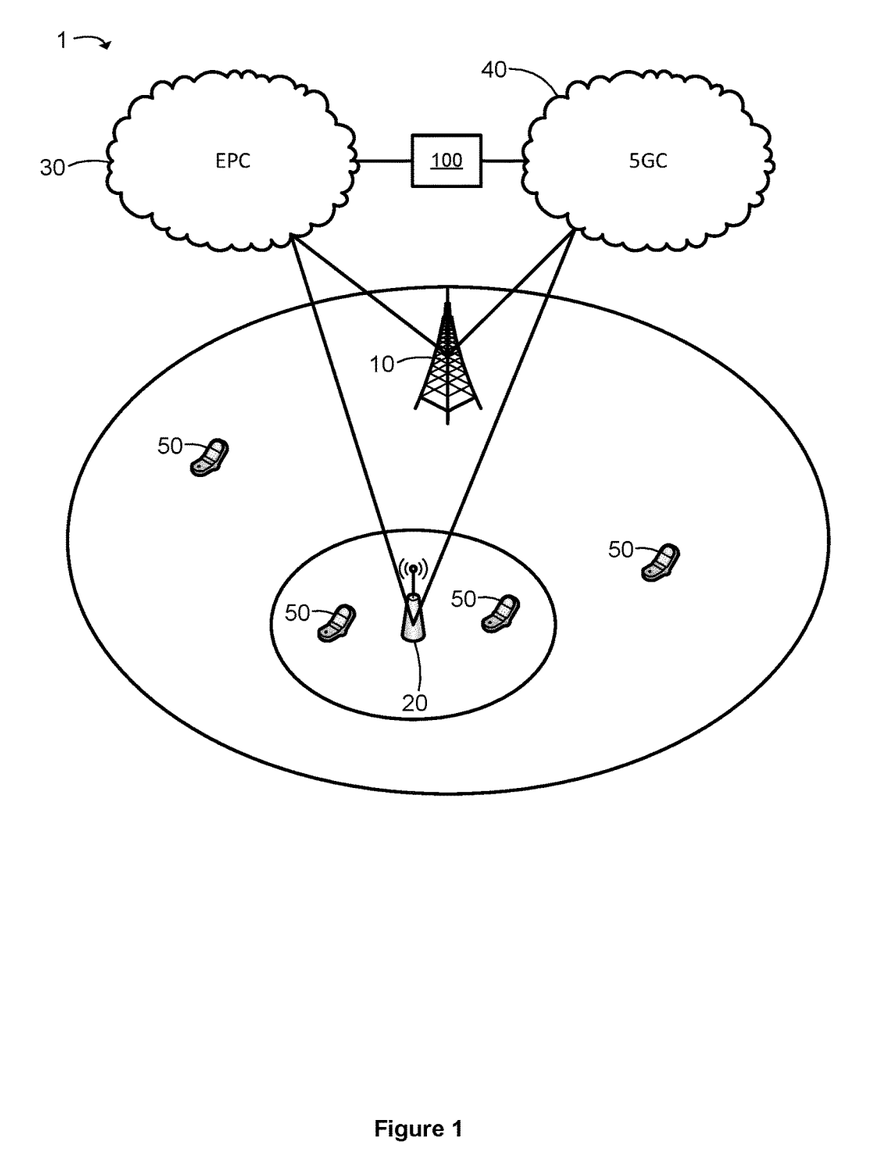
FIG. 1 is a schematic diagram of a first embodiment of a cellular telecommunications network of the present disclosure.

A first embodiment of a cellular telecommunications network 1 of the present disclosure will now be described with reference to FIGS. 1 to 2. FIG. 1 illustrates a first base station 10, a second base station 20, a first core network 30, a second core network 40, and a plurality of User Equipment (UE) 50. The respective coverage areas of the first base station 10 and second base station 20 are shown by their enveloping ellipses, illustrating a macrocell of the first base station 10 and a small cell of the second base station 20, in which the small cell is within the macrocell. A subset of the plurality of UE are positioned within both the macrocell of the first base station 10 and the small cell of the second base station 20. Each UE of this subset of the plurality of UEs have a dual-connection to both the first base station 10 and second base station 20.

The first core network 30 includes one or more core networking components of the 4G cellular networking protocol (in this embodiment, LTE), such as a Mobility Management Entity (MME), Serving GateWay (SGW) and Packet Data Network GateWay (PDN-GW). The second core network 40 includes one or more core networking components of the 5G cellular networking protocol, such as an Access and Mobility Function (AMF), User Plane Function (UPF) and Authentication Server Function (AUSF). Both the first and second core network 30, 40 are connected to a deployment management function 100, which will explained in more detail below.

Figure 2:
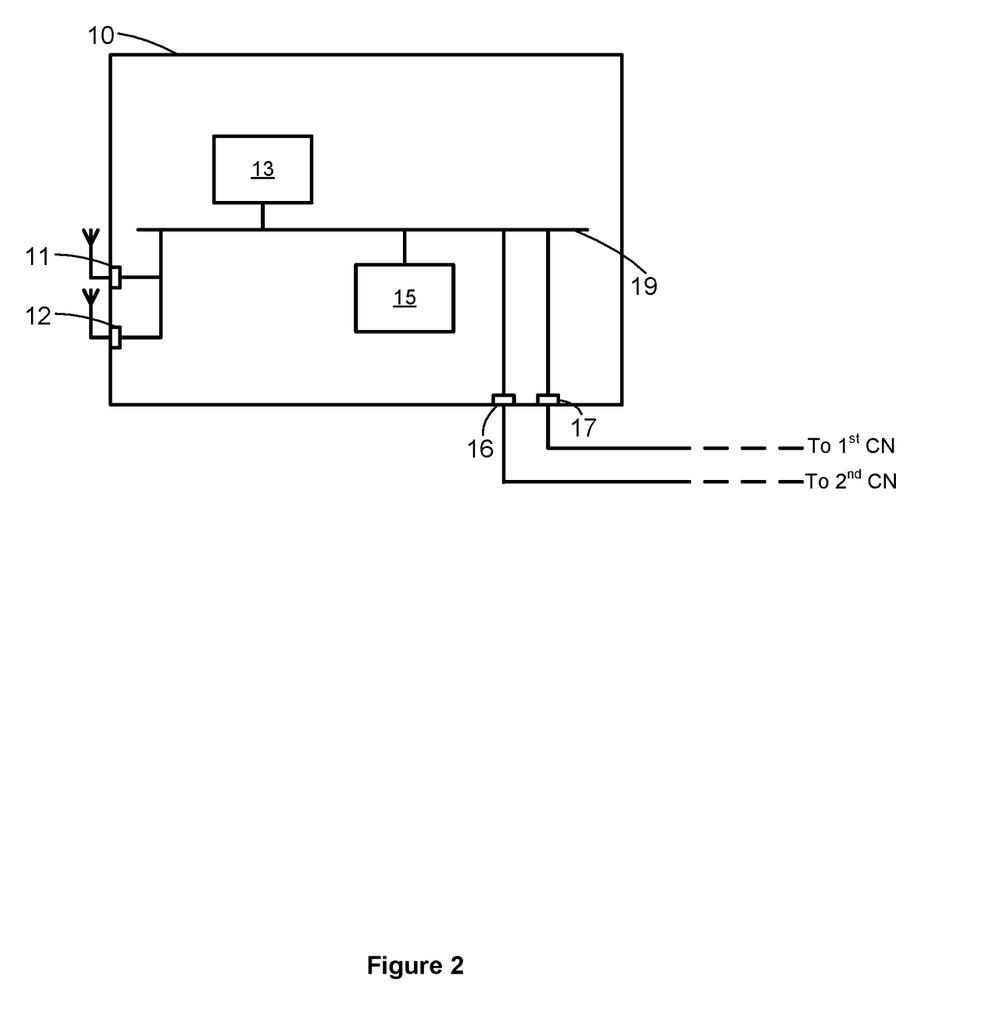
FIG. 2 is a schematic diagram of a base station of the network of FIG. 1.

The first base station 10 is shown in more detail in FIG. 2. The first base station 10 includes a first radio access communications interface 11 and a second radio access communications interface 12, each connected to a respective antenna, a processor 13, memory 15, a first backhaul communications interface 16 and a second backhaul communications interface 17, all connected via bus 19. The first backhaul communications interface 16 is connected to the first core network 30 by, in this embodiment, a wired connection (e.g. an optical fiber link), and the second backhaul communications interface 17 is also connected to the second core network 40 by, in this embodiment, a wired connection (e.g. an optical fiber link).

The first communications interface 11 and respective antenna are configured for communications via a first radio access protocol and the second communications interface 12 and respective antenna are configured for communications via a second radio access protocol. In this embodiment, the first radio access protocol is of a $4^{th}$ Generation (4G) cellular networking protocol specified by the $3^{rd}$ Generation Partnership Project (3GPP), generally referred to as "Long Term Evolution" (LTE), such as 3GPP Release 8, 9, 10, 11, 12, 13 or 14. Furthermore, in this embodiment, the second radio access protocol is of a $5^{th}$ Generation (5G) cellular networking protocol specified by the 3GPP, such as 3GPP Release 15 (or any subsequent release which is regarded as a 5G cellular networking protocol). The processor 13, memory 15 and bus 19 are also configured to facilitate communications for both these first and second cellular networking protocols.

The first base station 10 may utilize any combination of the first radio access communications interface 11, second radio access communications interface 12, first backhaul communications interface 16 and second backhaul communications interface 17, such that there are four modes of operation:
1. Backhaul: LTE, Radio Access: LTE;
2. Backhaul: 5G. Radio Access: LTE (in this mode, the first base station 10 is configured as an enhanced LTE eNodeB of 3GPP Release 15);
3. Backhaul: LTE, Radio Access: 5G; and
4. Backhaul: 5G, Radio Access: 5G.

Furthermore, the first base station 10 is configured to implement different modes of operation for different UEs, such as a first mode of operation for a first UE of the plurality of UEs, a second mode of operation for a second UE of the plurality of UEs, etc.

The second base station 20 is substantially similar to the first base station 10 and is therefore also configured to operate in any one of the four modes of operation defined above. However, as the second base station 20 has a substantially smaller coverage area (in this embodiment), the second base station's configuration settings may differ (e.g. the transmit power may be significantly lower).

Figure 3:
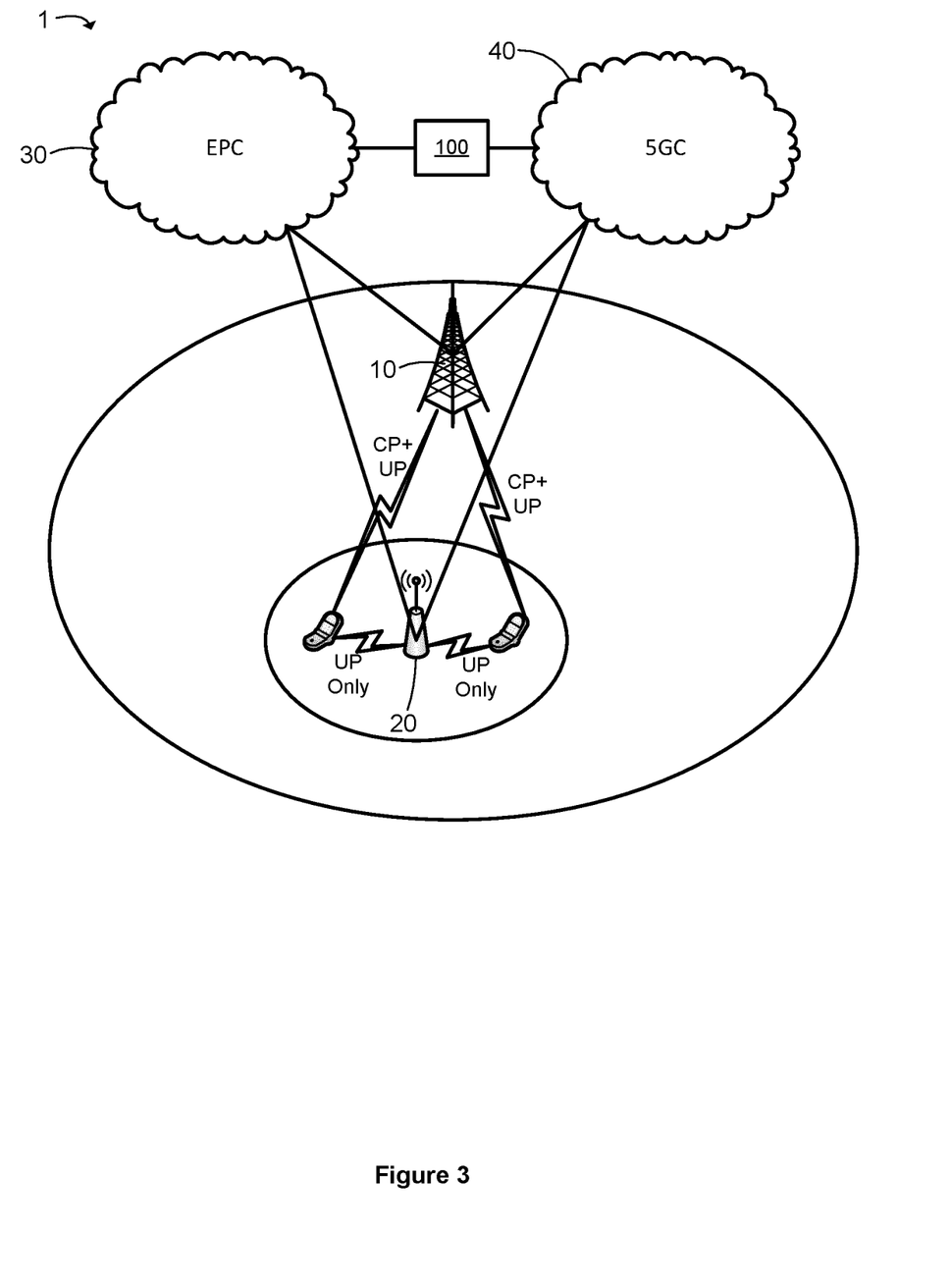
FIG. 3 is a schematic diagram of a network of a first embodiment of a method of the present disclosure, illustrating the network in a first state.

A first embodiment of a method of the present disclosure will now be described with reference to FIGS. 3 to 5. FIG. 3 illustrates the cellular telecommunications network 1 in a first state in which all devices of the cellular telecommunications network use the non-standalone deployment Option 7 (only two UEs are shown for simplicity). Accordingly, the first base station 10 is operating according to the second mode of operation (utilizing the second backhaul communications interface 17 operating according to 5G and the first radio access communications interface 11 operating according to LTE) for all UEs of the subset of UEs and the second base station 20 is operating according to the fourth mode of operation (utilizing both 5G radio access and backhaul communications interfaces) for all UEs of the subset of UEs. Furthermore, the first base station 10 is operating as a Master Node (MN) and therefore provides both user plane and control plane functionality to the subset of UEs, whilst the second base station 20 is operating as a Secondary Node (SN) and therefore provides additional resources to the subset of UEs for the user plane only.

In S1 of the method of this embodiment (shown in the flow diagram of FIG. 5), the first and second base stations 10, 20 and second core network 40 monitor their respective loads and report a value representing their monitored load to the deployment management function 100. In this embodiment, the load for the first and second base stations 10, 20 is based on the number of used Physical Resource Blocks (PRBs) compared to the number of available PRBs. Furthermore, in this embodiment, the load for the second core network 40 is based on one or more of the following:

Processor flops per cycle for one or more (e.g. an average of several) core networking nodes;
Number of subscribers;
Types of service being supported;
Number of simultaneous connections; and
Failures per software or hardware component.

In S3, the deployment management function 100 compares the monitored load of the first base station 10, the monitored load of the second base station 20, and the monitored load of the second core network 40 to a loading threshold. The loading threshold represents a maximum permissible loading of the first base station 10, second base station 20 and second core network 40 respectively, and may be individually configured by the Mobile Network Operator (MNO). In this example, the loading thresholds for the base stations are based on the number of used PRBs exceeding a predetermined percentage (e.g. 50%, 60%, 70%, 80% or 90%) of the available PRBs, and may further require that this criterion is satisfied for a predetermined period of time (e.g. 1 minute, 5 minutes, 10 minutes). In this example, the threshold for the second core network 40 is the processor flops per cycle for any core networking node exceeding a predetermined percentage (e.g. 50%, 60%, 70%, 80% or 90%) of its maximum, and may further require that this criterion is satisfied for a predetermined period of time (e.g. 1 minute, 5 minutes, 10 minutes).

In a first example of this embodiment, the monitored load of the first base station 10 surpasses its loading threshold whilst the monitored load of the second base station 20 and the monitored load of the second core network 40 are less than their respective loading thresholds. In response, the deployment management function 100 switches one or more UEs from their current deployment option to a new deployment option so as to balance the load in the network 1. Accordingly, in S5, the deployment management function 100 sends deployment configuration requests to the first base station 10, second base station 20 and second core network 40, identifying each UE of the subset of UEs to be switched and the new deployment option for each UE (in this embodiment, Option 4). The deployment management function 100 identifies specific UEs of the subset of UEs to be switched based on the current consumption of the UE, configuration parameters (as recorded in the second core network 40), and number/type of services consumed by the UE.

In S7, the first base station 10, second base station 20 and second core network 40 all respond to the deployment configuration requests with acknowledgment messages. It is then determined whether or not all acknowledgement messages indicate acceptance of the deployment configuration requests. If not, then the process loop ends and returns to S1. In this example, the acknowledgment messages indicate to the deployment management function 100 that the configurations are accepted for all UEs. In S9, on receipt of the positive acknowledgement messages, the deployment management function 100 sends a deployment configuration trigger message to the first base station 10, triggering the change in configuration to the identified deployment option (Option 4) for all UEs.

In S11, on receipt of the deployment configuration trigger message, the first base station 10 sends a first reconfiguration message to the second core network 40, the first reconfiguration message instructing the second core network 40 to commence communication of control traffic for the one or more UEs of the subset of UEs via the second base station 20. In response, the second core network 40 establishes the required logical links with the second base station 20 (such as by using the same process as standardized between base stations and core networks using the Option 4 deployment). Once established, the second core network 40 sends a first reconfiguration confirmation message to the first base station 10 indicating that the instruction has been carried out.

On receipt of the first reconfiguration confirmation message, the first base station 10 sends a second reconfiguration message (in this example, an RRC Reconfiguration message) to the one or more UEs of the subset of UEs, informing each of the one or more UEs that control messages will be sent via the second base station 20 instead of the first base station 10. In response, each of the one or more UEs establish a link with the second core network 40 (such as by using the same process as standardized between UEs and core networks using the Option 4 deployment). Once established, each of the one or more UEs sends a second reconfiguration confirmation message to the first and second base stations 10, 20. The second base station 20 forwards this message to the second core network 40.

Figure 4:
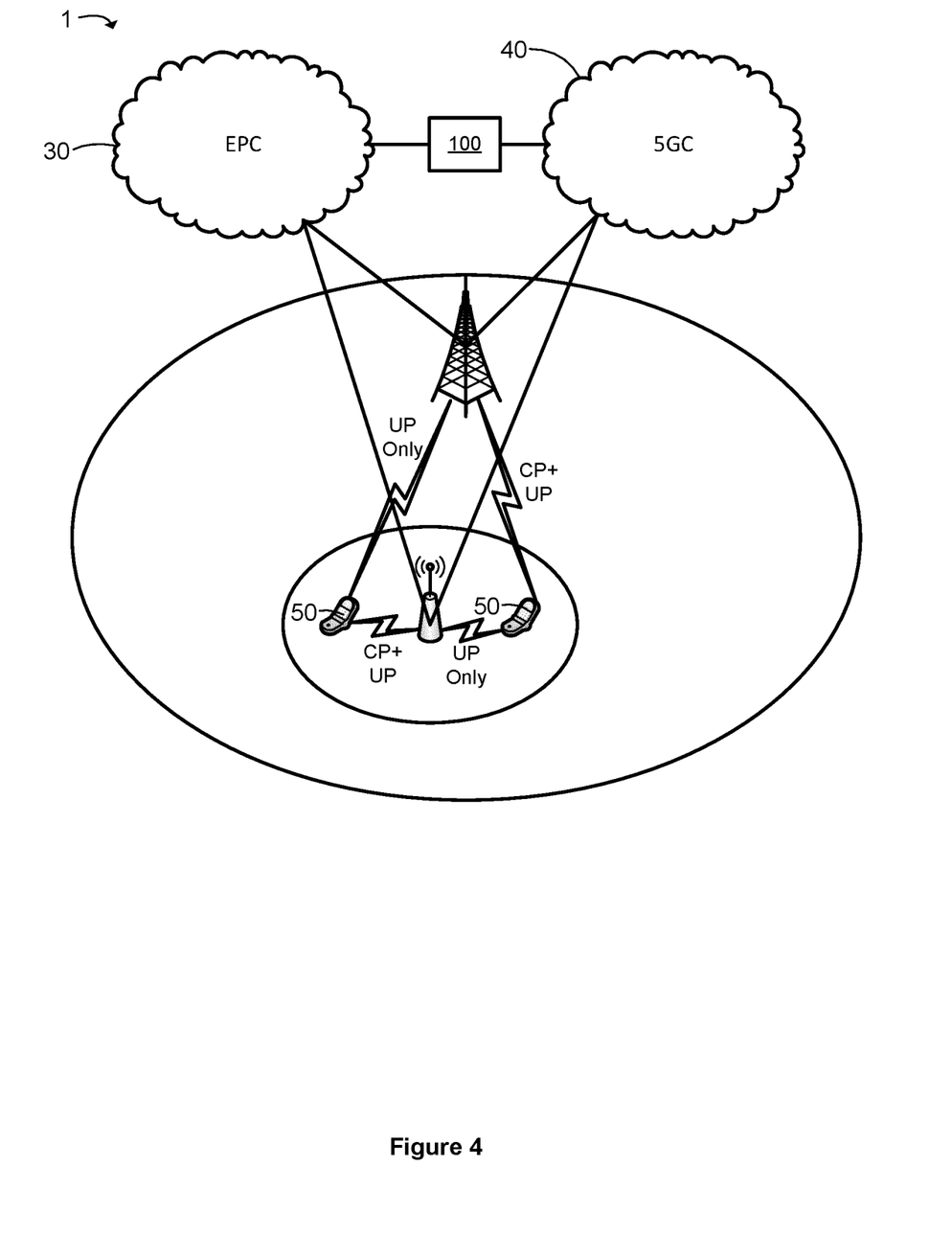
FIG. 4 is a schematic diagram of the network of FIG. 3 in a second state
Figure 5:
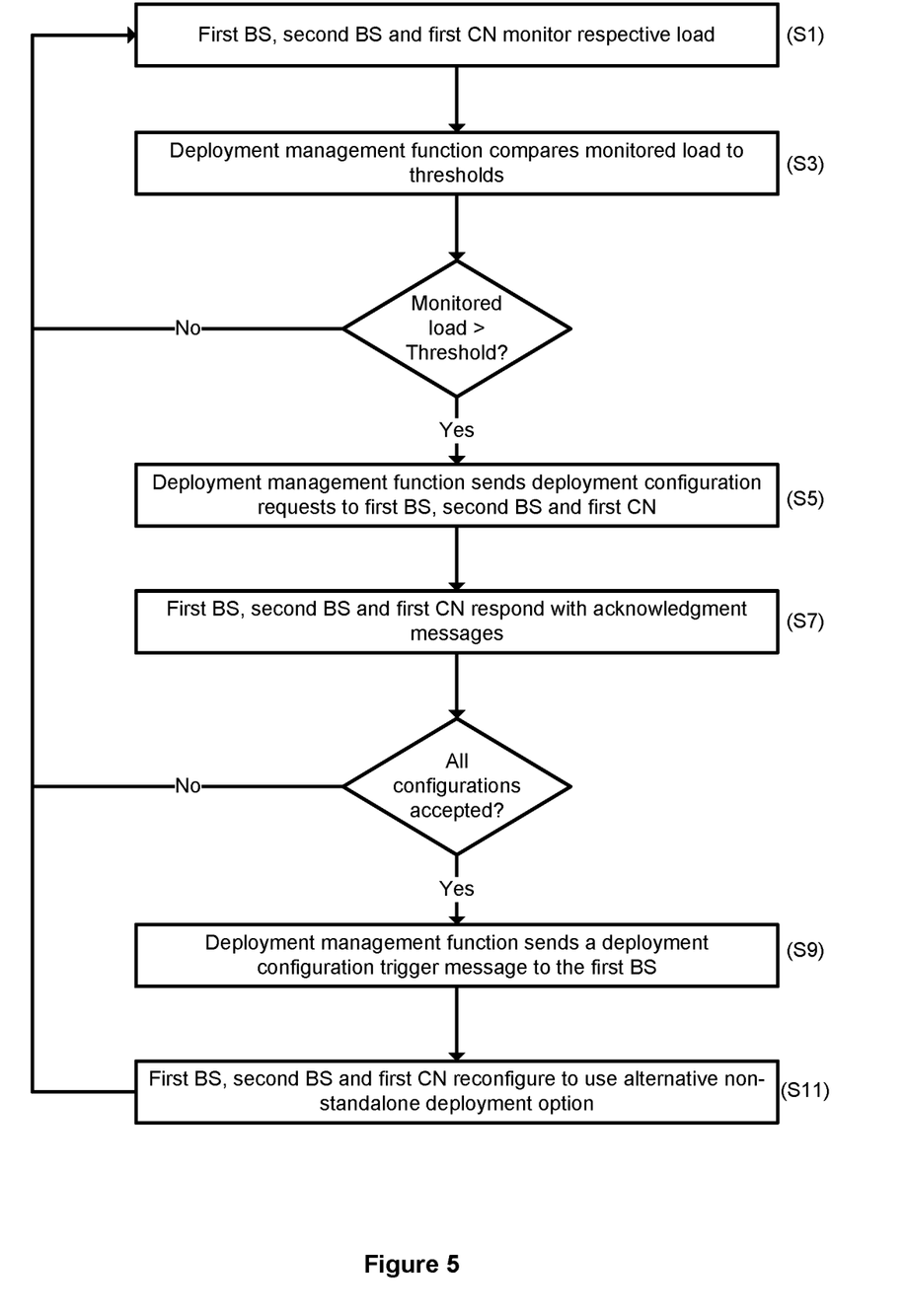
FIG. 5 is a flow diagram of the method of FIGS. 3 and 4.

Following this reconfiguration, the network 1 is in a second state as shown in FIG. 4, in which one or more UEs of the subset of UEs use the Option 4 deployment (so that the second base station 20 is the MN and the first base station 10 is the SN for these UEs) whilst the remaining UEs of the subset of UEs use the Option 7 deployment (so that the first base station 10 is the MN and the second base station 20 is the SN for these remaining UEs). Accordingly, some of the control traffic that was previously being handled by the first base station 10 is now being handled by the second base station 20, thus reducing the load on the first base station 10.

The process then loops back to S1 (optionally, via a delay timer) so that each base station iteratively monitors and reports its load. The process therefore dynamically switches between deployment options based on the current loading of each base station in the network.

There are further scenarios in which the deployment option for a subset of UEs may be switched in order to balance the load in the cellular network. For example:

1. The cellular network 1 initially uses the Option 3 deployment for all UEs (so that the first base station 10 is the MN and the second base station 20 is the SN), and the deployment management function 100 determines that the first base station 10 is overloaded. In response, a subset of UEs are switched to the Option 4 deployment, so that the second base station 20 is the MN and the first base station 10 is the SN for these UEs. Again, the control traffic for these UEs that was previously being handled by the first base station 10 is now being handled by the second base station 20, thus reducing the load of the first base station 10.

2. The cellular network 1 initially uses the Option 4 deployment for all UEs (so that the second base station 20 is the MN and the first base station is the SN), and the deployment management function 100 determines that the second base station 10 is overloaded. In response, a subset of UEs are switched to the Option 7 deployment, so that the first base station 10 is the MN and the second base station 20 is the SN for these UEs. Thus, the control traffic for these UEs that was previously being handled by the second base station 10 is now being handled by the first base station 10, thus reducing the load of the second base station 20. Furthermore, the deployment management function 100 may also respond by switching to the Option 3 deployment, which would have the same effect but further require that the first core network 30 is used instead of the second core network 40 for these UEs.

3. The cellular network 1 initially uses the Option 7 or Option 4 deployment for all UEs (so that the first and second base stations 10, 20 use their respective backhauls to the second core network 40), and the deployment management function 100 determines that the second core network 40 is overloaded. In response, a subset of UEs are switched to the Option 3 deployment, so that the first and second base stations 10, 20 use their respective backhauls to the first core network 30 for these UEs. This reduces the load on the second core network 40.

4. The cellular network 1 initially uses the Option 3 deployment for all UEs (so that the first and second base stations 10, 20 use their respective backhauls to the first core network 30), and the deployment management function 100 determines that the first core network 30 is overloaded. In response, a subset of UEs are switched to the Option 7 or Option 4 deployment, so that the first and second base stations 10, 20 use their respective backhauls to the second core network 40 for these UEs. This reduces the load on the first core network 30.

Accordingly, this disclosure provides a method of load balancing between the MN and SN and between the core networks by dynamically switching one or more UEs between non-standalone deployment options in response to a load-based trigger condition being satisfied. This increases the overall efficiency of the system, allowing more resources to be used for user plane traffic.

In the above embodiment, the method is implemented in a deployment management function accessible via either core network. However, the skilled person will understand that this is not essential and the method may, for example, be distributed. In a distributed arrangement, each node may monitor its load and trigger a deployment configuration request message to the other nodes in response to the monitored load exceeding a threshold. Following acceptance by the other nodes, the network may be reconfigured for a subset of UEs to use a different deployment option. Furthermore, the skilled person will understand that it is not essential for the centralized centralised version to be implemented in a dedicated node (the deployment management function), but instead may be implemented in one of the first base station, second base station, or a node of the first or second core network.

In either the centralized or distributed arrangements, the nodes may communicate using dedicated messages or by a new Information Element (IE) of an existing message.

In the examples above, the network initially implemented a single deployment option for all UEs before a subset of these UEs were switched to an alternative deployment option. However, the skilled person will understand that the method of the embodiment of the disclosure may be applied when the network uses a mixture of deployment options across the UEs. For example, if a first subset of UEs uses Option 7 and a second subset of UEs uses Option 4 then, in response to the deployment management function determining that the first base station is overloaded, the network may switch UEs of the first subset from Option 7 to Option 4, thus reducing the load on the first base station.

The skilled person will also understand that it is not essential that the network comprises two base stations to offer dual-connectivity to the plurality of UEs. That is, the network may comprise a single base station having a plurality of transmitters, in which the UE may reside within the coverage area of more than one of these transmitters.

It is also possible that more than one node will have a load that exceeds a threshold, which may then influence the decision on the new deployment mode. For example, if the starting scenario is for all UEs to use the Option 7 deployment (in which control traffic is sent via the first base station and the first and second base station use backhaul connections to a second core network) and both the first base station's monitored load and second core network's monitored load exceed respective thresholds, then a subset of UEs may be switched to the Option 3 deployment in which the control traffic is sent via the second base station and the first and second base station use backhaul connections to a first core network.

In the above embodiment, the deployment management function 100 identified specific UEs which would have their deployment option switched. However, this is non-essential. In alternative arrangements, the deployment management function 100 could arbitrarily identify UEs of the subset of UEs and then monitor the load in the network following the deployment option switch and, if the load is still in excess of the threshold, identify further UEs of the subset of UEs to switch. This process may operate iteratively until the load drops below the relevant threshold.

The skilled person will understand that any combination of features is possible within the scope of the invention, as claimed.

The invention claimed is:

1. A method of balancing load in a cellular telecommunications network, the cellular telecommunications network having a first transceiver, a second transceiver, a first core network and a plurality of User Equipment (UE), the method comprising:

connecting a UE of the plurality of UEs to the first transceiver and the second transceiver in a first non-standalone deployment mode in which the UE communicates control plane traffic and user plane traffic with the first transceiver and communicates user plane traffic only with the second transceiver;

monitoring a load of one or more of the first transceiver, the second transceiver and the first core network when the UE is connected in the first non-standalone deployment mode;

determining whether the load satisfies a trigger threshold; and if the load satisfies the trigger threshold, responding by connecting the UE to the first transceiver and the second transceiver in a second non-standalone deployment mode in which the UE communicates control plane traffic and user plane traffic with the second transceiver and communicates user plane traffic only with the first transceiver.

2. The method as claimed in claim 1, wherein the cellular telecommunications network further includes a second core network, the first transceiver and the second transceiver both include backhaul connections to both the first core network and the second core network, and monitoring the load is of one or more of the first transceiver, the second transceiver, the first core network and the second core network, and wherein, in the first non-standalone deployment mode, the UE communicates with the first core network via the first transceiver and the second transceiver, and, in the second non-standalone deployment mode, the UE communicates with the second core network via the first transceiver and the second transceiver.

3. The method as claimed in claim 1, wherein a first communications protocol is used between the UE and the first transceiver and a second communications protocol is used between the UE and the second transceiver.

4. The method as claimed in claim 2, wherein a first communications protocol is used between the UE and the first core network and a second communications protocol is used between the UE and the second core network.

5. A computer system comprising:
at least one processor and memory configured to balance load in a cellular telecommunications network, the cellular telecommunications network having a first transceiver, a second transceiver, a first core network and a plurality of User Equipment (UE) by:
connecting a UE of the plurality of UEs to the first transceiver and the second transceiver in a first non-standalone deployment mode in which the UE communicates control plane traffic and user plane traffic with the first transceiver and communicates user plane traffic only with the second transceiver;
monitoring a load of one or more of the first transceiver, the second transceiver and the first core network when the UE is connected in the first non-standalone deployment mode;
determining whether the load satisfies a trigger threshold; and
if the load satisfies the trigger threshold, responding by connecting the UE to the first transceiver and the second transceiver in a second non-standalone deployment mode in which the UE communicates control plane traffic and user plane traffic with the second transceiver and communicates user plane traffic only with the first transceiver.

6. A non-transitory computer-readable storage medium storing a computer program comprising instructions which, when the computer program is executed by a computer, cause the computer to carry out the method of claim 5.

7. A network node for a cellular telecommunications network, the cellular telecommunications network having a first transceiver, a second transceiver, a first core network and a plurality of User Equipment (UE), wherein a UE of the plurality of UEs is connected to the first transceiver and the second transceiver in a first non-standalone deployment mode in which the UE communicates control plane traffic and user plane traffic with the first transceiver and communicates user plane traffic only with the second transceiver, the network node comprising:
a processor configured to:
monitor a load of one or more of the first transceiver, the second transceiver and the first core network when the UE is connected in the first non-standalone deployment mode;
determine whether the load satisfies a trigger threshold; and
if the load satisfies the trigger threshold, responding by causing the UE to connect to the first transceiver and the second transceiver in a second non-standalone deployment mode in which the UE communicates control plane traffic and user plane traffic with the second transceiver and communicates user plane traffic only with the first transceiver.

8. The network node as claimed in claim 7, wherein the cellular telecommunications network further includes a second core network, the first transceiver and the second transceiver both include backhaul connections to both the first core network and the second core network and the processor is further configured to monitor the load of the second core network, wherein, in the first non-standalone deployment mode, the UE communicates with the first core network via the first transceiver and the second transceiver, and, in the second non-standalone deployment mode, the UE communicates with the second core network via the first transceiver and the second transceiver.

9. The network node as claimed in claim 7, wherein a first communications protocol is used between the UE and the first transceiver and a second communications protocol is used between the UE and the second transceiver.

10. The network node as claimed in claim 8, wherein a first communications protocol is used between the UE and the first core network and a second communications protocol is used between the UE and the second core network.

11. The network node as claimed in claim 7, wherein the first transceiver or the second transceiver is the network node.

* * * * *

UNITED STATES PATENT AND TRADEMARK OFFICE
CERTIFICATE OF CORRECTION

PATENT NO. : 11,985,545 B2  
APPLICATION NO. : 17/754168  
DATED : May 14, 2024  
INVENTOR(S) : Salvador Diaz Sendra Page 1 of 1

It is certified that error appears in the above-identified patent and that said Letters Patent is hereby corrected as shown below:

On the Title Page

In item (57), in Column 2, in "Abstract", Line 11, delete "of" and insert -- or --.

On the page 2, item (56), in Column 2, under "Other Publications", Line 3, delete "Centre ;" and insert -- Centre; --.

On the page 2, item (56), in Column 2, under "Other Publications", Line 3, delete "Lucioles ;" and insert -- Lucioles; --.

In the Specification

In Column 3, Line 42, delete "state" and insert -- state. --.

In the Claims

In Column 9, Line 10, in Claim 2, after "load" delete "is".

Signed and Sealed this  
Ninth Day of July, 2024

Katherine Kelly Vidal  
*Director of the United States Patent and Trademark Office*